United States Patent [19]
Freitag et al.

[11] Patent Number: 5,987,768
[45] Date of Patent: Nov. 23, 1999

[54] ARRANGEMENT FOR FASTENING A LENGTH MEASUREMENT DEVICE

[75] Inventors: Hans-Joachim Freitag; Ludwig Boege, both of Jena, Germany

[73] Assignee: Carl Zeiss Jena GmbH, Jena, Germany

[21] Appl. No.: 08/809,033

[22] PCT Filed: Jul. 15, 1996

[86] PCT No.: PCT/EP96/03094

§ 371 Date: Mar. 19, 1997

§ 102(e) Date: Mar. 19, 1997

[87] PCT Pub. No.: WO97/04286

PCT Pub. Date: Feb. 6, 1997

[30] Foreign Application Priority Data

Jul. 20, 1995 [DE] Germany .................. 195 26 517

[51] Int. Cl.$^6$ ................................ G01B 11/02
[52] U.S. Cl. ................ 33/706; 33/702; 33/707
[58] Field of Search ................ 33/706, 700, 702, 33/703, 707, 708, 704, 705

[56] References Cited

U.S. PATENT DOCUMENTS

| 4,295,742 | 10/1981 | Nelle et al. | 33/707 |
|---|---|---|---|
| 4,381,609 | 5/1983 | Holstein | 33/708 |
| 4,559,707 | 12/1985 | Oberhans | 33/706 |
| 4,570,346 | 2/1986 | Burkhardt | 33/706 |
| 4,731,930 | 3/1988 | Miller | 33/700 |

FOREIGN PATENT DOCUMENTS

| 0118607 | 9/1984 | European Pat. Off. . |
|---|---|---|
| 0293268 | 5/1987 | European Pat. Off. . |
| 0 314 940 | 5/1989 | European Pat. Off. . |
| 2643304 | 9/1976 | Germany . |
| 2712421 | 3/1977 | Germany . |
| 4320728 | 6/1993 | Germany . |
| 43 18 017 | 12/1994 | Germany . |
| 9420679 | 12/1994 | Germany . |
| WO/90 02919 | 9/1988 | WIPO . |

OTHER PUBLICATIONS

Machine Moderne, Dec. 1996 "Commande numerique pour machines–outils de precision" L. Rabian.
Heidenhain, "NC–Längenmess Systeme," Apr. 194, pp. 44–45.
Hans Eckenspieler, "Innovativer Schritt in de Lineartechnologie", Technish Rundschau, No. 35, 1992, pp. 54–56.
Company Schneeberger brochures, "Monorail" and "MMS", pp. 52–54 (Date Unknown).
Company Schneeberger brochures, "Heidenhain–Lieferübersicht", Aug. 1994.

Primary Examiner—Christopher W. Fulton
Attorney, Agent, or Firm—McAulay Nissen Goldberg Kiel & Hand, LLP

[57] ABSTRACT

In an arrangement for fastening a length measurement device at a guide rail for a guide slide which is movable in the longitudinal direction of the guide rail and has a measurement rod and a measuring head which is movable relative to the latter, wherein the measuring head is detachably connected with the guide slide, the measurement rod is coupled directly, or indirectly in a positive engagement via a measurement rod carrier body connected with it, directly to the guide rail (1)so as to be detachable. The measurement rod or the measurement rod carrier body can be inserted by its longitudinal edges into corresponding recesses arranged at the guide rail.

8 Claims, 2 Drawing Sheets

ARRANGEMENT FOR FASTENING A LENGTH MEASUREMENT DEVICE

BACKGROUND OF THE INVENTION a) Field of the Invention

The invention is directed to an arrangement for fastening a length measurement device and can be used, for example, for combined positioning and measuring devices in machine tool construction and machine construction in general.

b) Description of the Related Art

Numerous positioning devices and measuring devices which enable the fastening of a length measurement device to a machine tool are known from the prior art. These positioning and measuring devices are completely independent units which are also manufactured separately (DE-C-27 12 421).

Normally, the guide of a base frame and the associated carriage or slide are mounted at the positioning device of a machine tool independently from one another and so as to be aligned separately relative to one another. In order for the measurement task to be properly carried out, special requirements and conditions must be met to bring the positioning device and measurement system into a working relationship. In particular, specially machined mounting faces must be provided at the machine, base bed, and slide. Also, special adjustment means are required for aligning the measurement system with respect to the operation of the slide. The mounting of the measurement system on the machine is very time-consuming.

Special mounting means in the form of a mounting rail for measurement systems is known from the company publication "NC Length Measurement Systems[NC-L ängenmeßsysteme]" by the Heidenhain company, April 1994. On the one hand, this mounting rail serves for mechanical stabilization and to compensate for thermal expansion between the base frame of the machine and the measurement system. On the other hand, after separate mounting on the base frame of the machine, a simplified mounting and a simplified exchange of the measurement system relative to the mounting rail can be achieved by means of this mounting rail. However, a disadvantage consists in that this mounting rail itself must be mounted on the machine in accordance with the same criteria as those of the unaccompanied measurement system and must be aligned with the guiding operation of the slide and in that the additional expensive mounting rail adds appreciably to the total cost.

Another type of measurement system is known from WO 90/02919. In this case, a self-adhesive steel-strip measurement rod is glued on the machine bed or base body via an applicator so as to be aligned with the guiding operation of the slide. A measurement system solution of this type is very costly in terms of assembly and the achievable basic accuracy of the measurement system is relatively inferior, since the inherent stability of the measurement strip is relatively poor and the measuring capability of the measurement rod deteriorates as a result of the slightest mechanical stresses or stress differences which are inevitable during the gluing-on process.

OBJECT AND SUMMARY OF THE INVENTION

The primary object of the invention, in view of the described prior art, is to provide an arrangement for fastening a length measurement device by means of which the measurement system can be mounted simply and quickly, e.g., on a linear guide unit. The measurement process is not adversely affected in so doing.

According to the invention, this object is met in a generic arrangement for fastening a length measurement device in that a measurement rod is coupled directly, or directly in a positive engagement via a measurement rod carrier connected with it, to the guide rail so as to be detachable.

According to a preferred construction of the invention, the measurement rod or the measurement rod carrier can be inserted by its longitudinal edges into corresponding recesses arranged at the guide rail.

In an advantageous further development of the invention, the recesses and shaped rail are constructed from one piece.

In a preferred further development of the invention, the recesses are constructed as a groove or slots.

The recesses are advantageously constructed so as to be continuous.

In an advantageous construction of the invention, the recesses are constructed as blocks.

The measurement rod is advantageously constructed as an easily bending metal strip and can be aligned and stabilized relative to the guide rail via the positive engagement.

In another advantageous construction of the invention, the measurement rod is fixed at a location in the longitudinal direction in a positive engagement and detachably relative to the guide rail. The arrangement can be constructed in such a way that the measurement rod is fixed at the guide rail by one end.

The solution according to the invention provides the user with a combined positioning unit and measurement system as one constructional unit by means of which the measurement system may be mounted on machine tools simply, quickly and thus economically.

The user need only provide mounting surfaces for the positioning system, since the mounted measurement system is already aligned with the guide unit. The measurement system can be exchanged as an autonomous unit independently from the positioning unit. Accordingly, for servicing, both the positioning unit and the measurement system can be exchanged independently from one another and accordingly also repaired separately.

In the following, the invention will be explained more fully with reference to a basic diagram.

DESCRIPTION OF THE PREFERRED EMBODIMENTS

Figure 1:
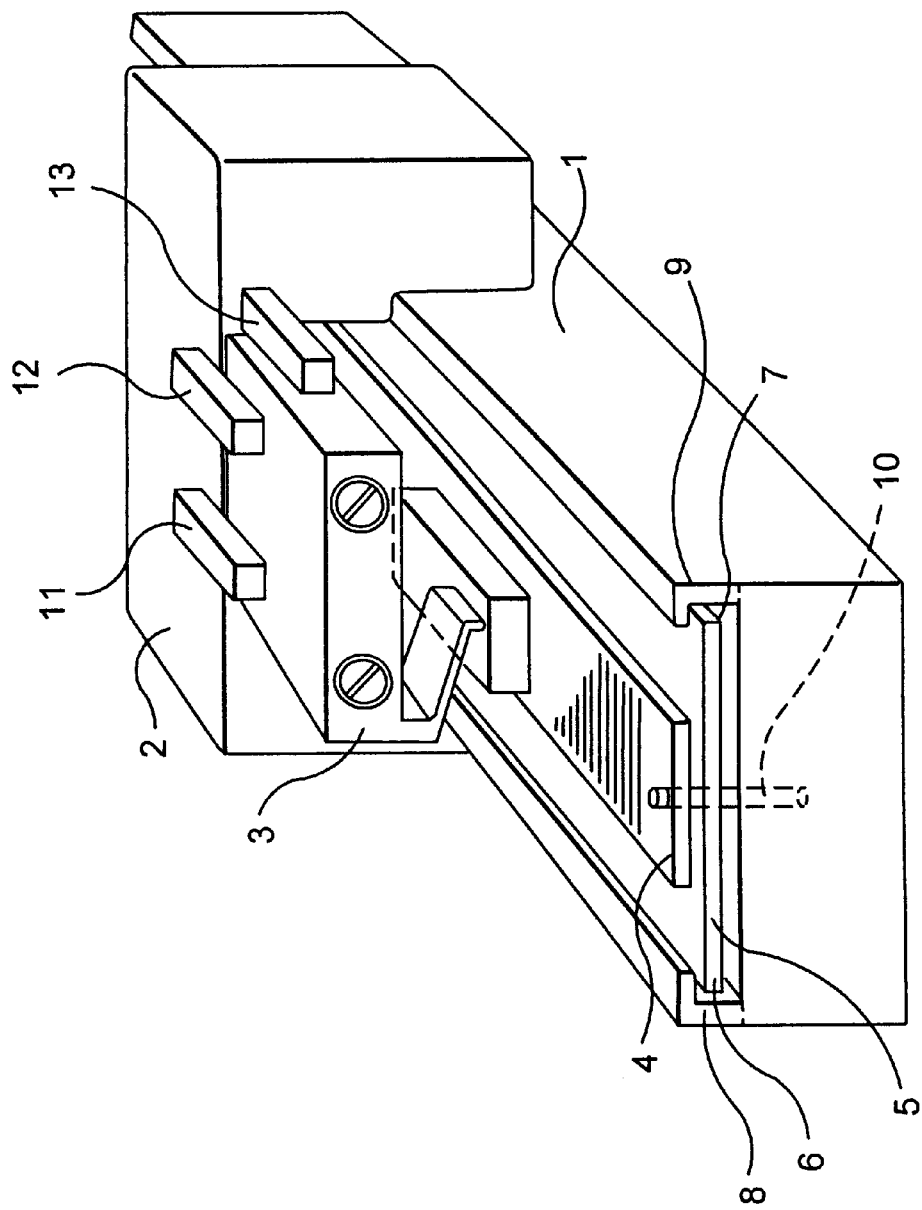
FIG. 1 shows a basic diagram of the arrangement according to the invention.

In the arrangement shown schematically in FIG. 1, a guide slide 2 which is movable in the longitudinal direction is arranged in a guide rail 1.

The guide slide 2 is connected with a measuring head 3 in a stationary manner but so as to be detachable, e.g., via a screw connection.

A measurement rod 4 is received by an elongate measurement rod carrier body 5. The measurement rod 4 is advantageously connected with the measurement rod carrier body 5 via an elastic glue. However, there are also other possible types of fastening which are generally known among those skilled in the art.

The measuring head 3 is connected with an evaluating unit, not shown, via connection elements which are generally known in electronic engineering. The control of the guide slide and evaluation of the measurement signals are carried out by means of this evaluating unit.

The measurement rod carrier body 5 is so constructed that it has two contact faces 6, 7, e.g., in the form of slots, within its longitudinal extension. Recesses 8, 9 are located in the longitudinal direction and are so dimensioned that the measurement rod carrier body is received in a positive engagement such as is conventional in precision mechanical engineering.

The recesses 8, 9 can be formed in one piece integral with the guide rail 1. The recesses 8, 9 can be arranged on the guide rail 1 in a continuous manner as a groove or slot or in an interrupted manner as blocks by fastenings which are generally well known in measurement technology, e.g., by means of gluing.

The recesses 8, 9 are so constructed in the longitudinal direction that the measurement system comprising the measuring head 3, measurement rod 4, and measurement rod carrier body 5 is adjusted for measurement after the insertion of the measurement rod carrier body 5.

The measurement rod carrier body 5 is connected in a stationary manner with the guide rail 1 via a fastening element 10, e.g., a screw, for positionally stable coordination of the measurement rod carrier body 5 and measurement rod 4 relative to longitudinal guidance.

Three stop elements 11, 12 and 13 are located at the guide slide 2, by means of which the latter is connected with the measuring head.

The stop elements 11, 12 and 13 are so dimensioned that the measuring head 3 only contacts the stops when fastened at the guide slide 2 so as to ensure coordination between the measuring head 3 and measurement rod 4 without further adjustment. This has the advantage, above all in large-scale series production of positioning devices comprising the guide rail 1 and the guide slide 2, that the measurement system is mounted in or at the positioning unit in a very simple, dependable and economical manner. On the other hand, the measurement system can be disassembled and assembled independently from the positioning unit.

For reasons pertaining to manufacture, it is usually advantageous to construct the contact faces 6, 7 and recesses 8, 9 so as to be continuous in the longitudinal direction.

Figure 2:
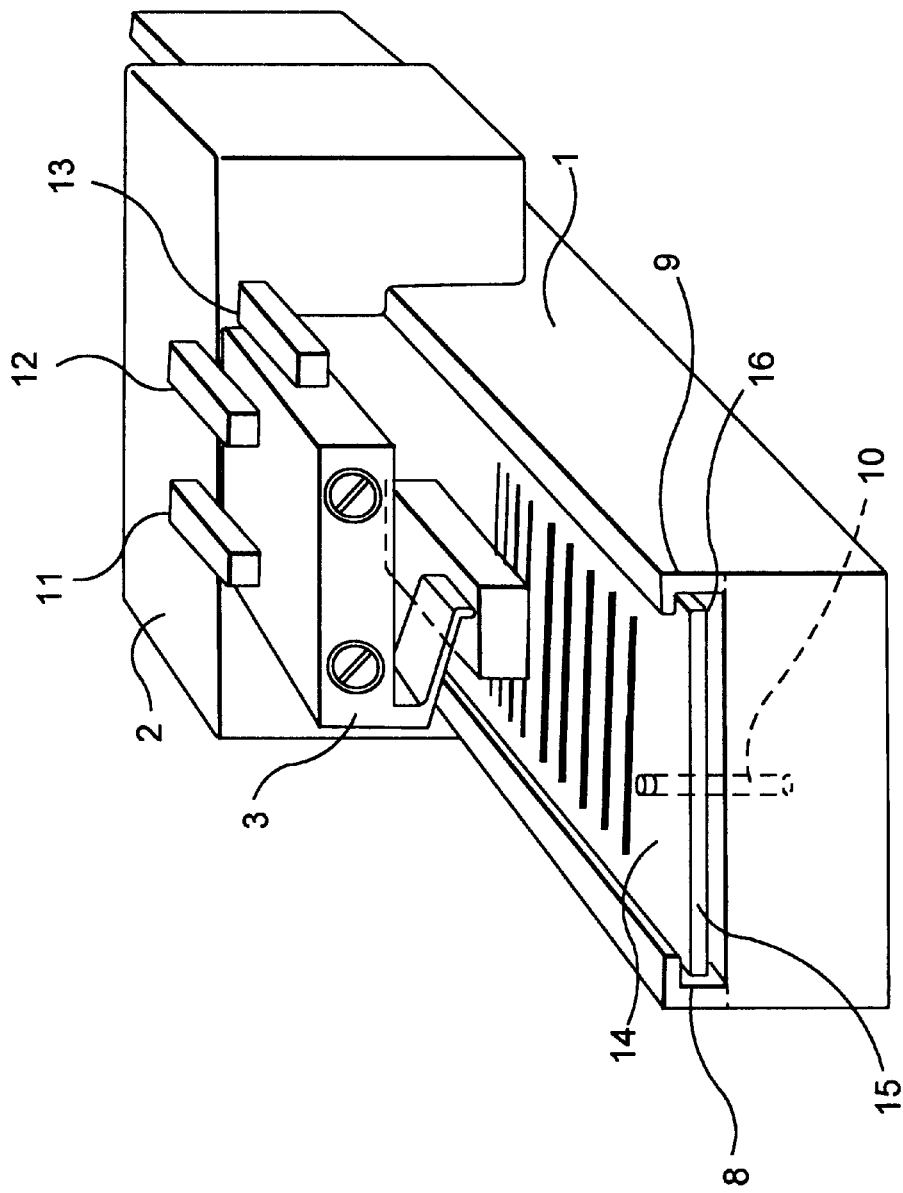
FIG. 2 shows another embodiment form of the arrangement according to the invention.

In the embodiment form shown in FIG. 2, the scale or graduation of the measurement rod 14 is located on the measurement rod carrier body 5 according to FIG. 1 or the body of the measurement rod 14 is constructed with sufficient stiffness such that it can slide into the recesses 8, 9 in a positive engagement in the longitudinal direction as is described in FIG. 1. In so doing, the contact faces 15, 16 of the measurement rod 14 take over the function of the contact faces 6, 7 of the measurement rod carrier body 5 as is described in FIG. 1.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for fastening a length measurement device to a guide rail for a guide slide which is movable in the longitudinal direction of said guide rail, said arrangement comprising:

a measurement rod;

a measurement head which is movable relative to the measuring rod;

said measuring head being detachably connected with said guide slide;

said measurement rod being fixed at a longitudinal position at said guide rail and coupled by one of a direct engagement and a positive engagement via a measurement rod carrier body connected with it to the guide rail so as to be detachable;

three stops elements being in abutting contact with said measuring head and being located at said guide slide so as to align said measuring head with the measuring rod.

2. The arrangement according to claim 1, wherein one of the measurement rod and the measurement rod carrier body can be inserted by its longitudinal edges into corresponding recesses arranged at the guide rail in order to form the positive engagement.

3. The arrangement according to claim 2, wherein the recesses and the guide rail are constructed from one piece.

4. The arrangement according to claim 2, wherein the recesses are constructed as a groove.

5. The arrangement according to claim 2, wherein the recesses are constructed so as to be continuous.

6. The arrangement according to claim 5, wherein the measurement rod is fixed at the guide rail by one end.

7. The arrangement according to claim 2, wherein the recesses are constructed as blocks.

8. The arrangement according to claim 1, wherein the measurement rod is constructed as an easily bending metal strip and can be aligned and stabilized relative to the guide rail (1) via the positive engagement.

* * * * *